United States Patent [19]

Sedam et al.

[11] 4,412,292

[45] Oct. 25, 1983

[54] SYSTEM FOR THE REMOTE MONITORING OF VENDING MACHINES

[75] Inventors: Jason K. Sedam; James V. M. Hale, both of Dunwoody; Stewart W. Caldwell, Marietta, all of Ga.; Willard T. Bushman, Palm Bay; Richard A. Wright, Melbourne, both of Fla.

[73] Assignee: The Coca-Cola Company, Atlanta, Ga.

[21] Appl. No.: 235,122

[22] Filed: Feb. 17, 1981

[51] Int. Cl.³ .................. G06F 15/20; G07F 11/00; H04M 11/04

[52] U.S. Cl. ........................... 364/479; 221/9; 340/825.36

[58] Field of Search ............... 364/479, 550, 900; 340/870.01, 825.36, 679; 133/2, 4 A; 221/9, 14, 21; 222/52; 179/2 AM

[56] References Cited

U.S. PATENT DOCUMENTS

| | | | |
|---|---|---|---|
| 3,289,165 | 11/1966 | Hawley et al. | 340/151 |
| 3,357,011 | 12/1967 | Diaz | 340/347 |
| 3,365,700 | 1/1968 | Cortner | 340/153 |
| 3,588,357 | 6/1971 | Sellari | 179/2 |
| 3,651,466 | 3/1972 | Galpin | 340/150 |
| 3,842,208 | 10/1974 | Paraskevakos | 179/5 R |
| 3,858,181 | 12/1974 | Goldsby et al. | 340/679 |
| 4,075,463 | 2/1978 | Eguizabal | 235/92 AC |
| 4,086,434 | 4/1978 | Bocchi | 179/2 AM |
| 4,108,363 | 8/1978 | Susumu | 235/383 |
| 4,216,461 | 8/1980 | Werth et al. | 364/479 |
| 4,231,105 | 10/1980 | Schuller et al. | 364/900 |
| 4,237,536 | 12/1980 | Enelow et al. | 364/900 |
| 4,241,237 | 12/1980 | Paraskevakos et al. | 179/2 AM |
| 4,328,539 | 5/1982 | Heeger | 364/479 |

Primary Examiner—Errol A. Krass
Attorney, Agent, or Firm—Birch, Stewart, Kolasch & Birch

[57] ABSTRACT

A system for the remote monitoring of vending machines and for automatically communicating conditions at the vending machines to a central computer complex is described. Each vending machine is provided with a microprocessor which monitors and stores data within that machine and transmits the data to the central computer complex either immediately or at scheduled call-in times. The distributed logic between the vending machine microprocessors and the central computer complex provides various alarm function signals and aids in inventory control and efficient route planning for the supply and maintenance of the machines. In a preferred embodiment the data is transmitted between the central computer complex and each vending machine over telephone lines.

11 Claims, 16 Drawing Figures

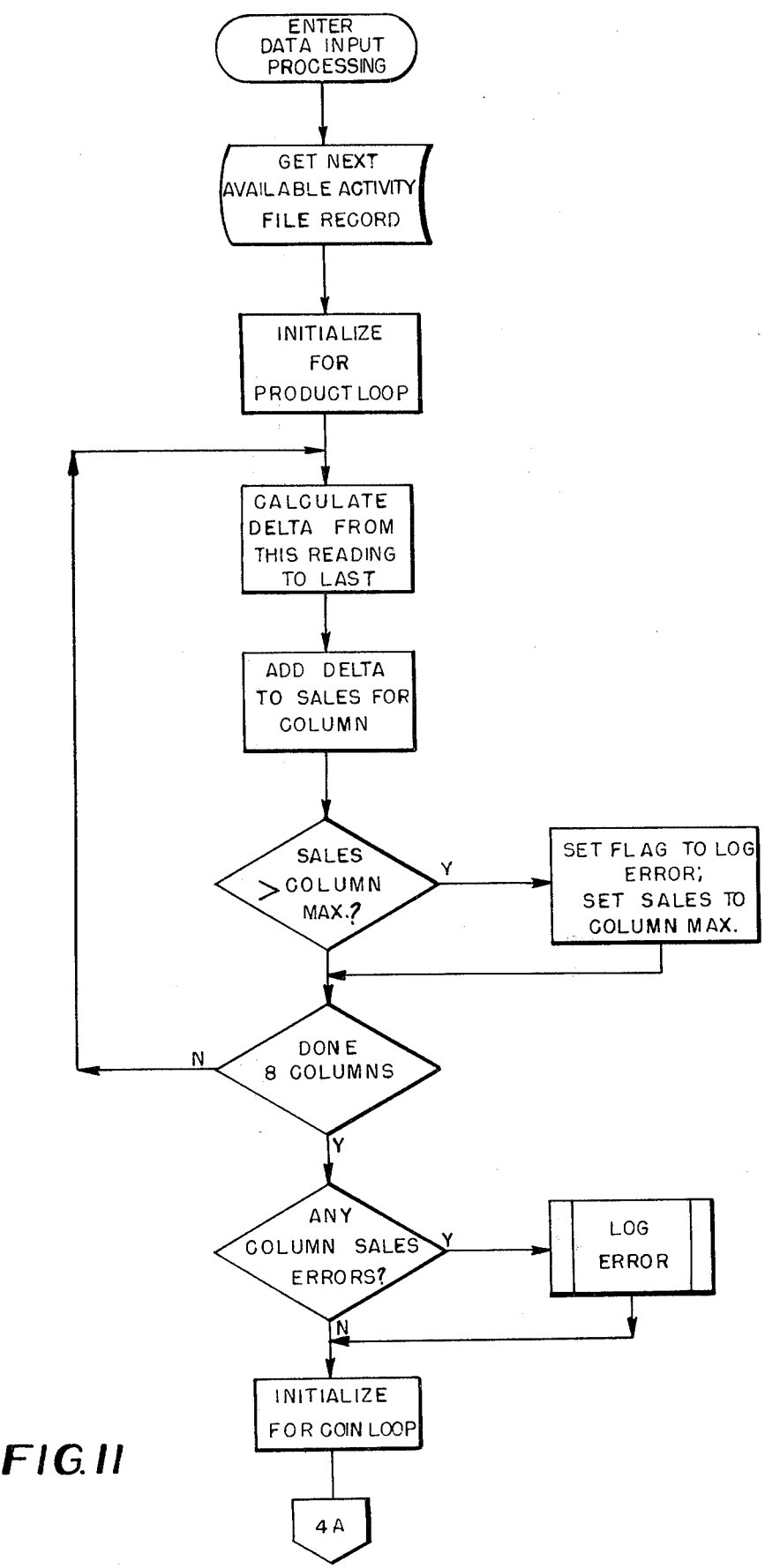
FIG. II

SYSTEM FOR THE REMOTE MONITORING OF VENDING MACHINES

BACKGROUND OF THE INVENTION

The present invention relates to a system for the remote monitoring of a plurality of sensors in a coin-operated vending machine and for automatically communicating the condition of said sensors to a central computer complex for analysis and control. More specifically, the present invention permits the complete control of a plurality of vending machines at remote stations from a central location with the aid of a central computer in order to monitor inventory, product demand, and certain alarm conditions which may occur at each remote vending machine station.

DESCRIPTION OF THE PRIOR ART

Heretofore, devices have been developed for monitoring various occurrences within vending machines such as inventory changes, service calls, cash receipts, demand for certain products, sold-out conditions, and miscellaneous alarm functions. However, the broad generic functions provided by the vending machine monitoring systems of the prior art have been limited in the details of their functional capabilities and, therefore, the amount of relevant data that could be generated to facilitate a smooth and efficient operation of a network of vending machines. The following U.S. patents are examples of the general state of the prior art referred to:

U.S. Pat. No. 3,365,700—Cortner—Jan. 1968
U.S. Pat. No. 3,651,466—Galpin—Mar. 1972
U.S. Pat. No. 3,842,208—Paraskevakos—Oct. 1974
U.S. Pat. No. 4,075,463—Eguizabal—Feb. 1978
U.S. Pat. No. 4,108,363—Susumu—Aug. 1978
U.S. Pat. No. 4,241,237—Paraskevakos et al.—Dec. 1980

Accordingly, a need in the art exists for a vending machine monitoring and reporting system which can monitor and transmit an increased amount of relevant and useful data to a central computer complex for analysis and control.

SUMMARY OF THE INVENTION

Accordingly, it is a primary object of the present invention to provide a system for monitoring and telemetering data from a plurality of vending machines at remote locations to a central computer complex.

It is another object of the present invention to provide a vending machine monitoring and communication system which will eliminate unnecessary service calls on the vending machines at various remote locations.

It is still another object of the present invention to improve the efficiency of the use of manpower and equipment in vending supply operations.

It is yet another object of the present invention to minimize the occurrence of unaccountable monetary losses in vend sales.

It is still a further object of the present invention to provide for a more efficient scheduling of routes and truck loading for supplying the vending machines.

It is another object of the present invention to provide for faster route settlement on full-service routes.

It is another object of the present invention to generate sufficient data output from the vending machine monitoring system to facilitate better supply route planning.

It is still another object of the present invention to provide for the complete and accurate monitoring of inventory so that better planning can be performed for the purposes of achieving increased sales of the vended products.

It is still another object of the present invention to provide energy conservation by controlling on a temperature and or operational time basis the operation of the refrigeration systems.

It is a further object of the present invention to provide a vending machine monitoring and telemetering system which senses and transmits a variety of pertinent alarm conditions to a central computer complex where said conditions can receive the immediate attention of management.

In a preferred embodiment, the vending machine monitoring and communication system of the present invention includes a microprocessor module which is installed within each vending machine, and attached to a number of sensing points including: a changer; vend relays; credit relays; selector buttons; sold out indicators; temperature sensors; compressors; and a vending machine door actuated switch. In addition, there are two manual push-button switches connected to the microprocessor which are utilized in combination with appropriate logic circuitry to determine if an entry into the vending machine is authorized or unauthorized. Power is supplied by a small battery connected to a trickle recharger, for supplying the proper bias power to the microprocessor. The microprocessor may be connected to a telephone line by means of an industry standard telephone interface jack.

The central computer complex may include, for example, an IBM series/I Processor, the configuration details of which are dependent upon the number of vending machines being serviced and the scope of the processing being done.

The microprocessor module in a preferred embodiment is an RCA 1802 integrated circuit chip. However, other modules such as a Motorola MC 146805 integrated circuit would also be suitable for use in the system of the present invention.

In operation, the microprocessor in each of the respective vending machine units monitors the activity and condition of the vending machine, maintaining running totals of sales by product and cash. At predetermined intervals control circuitry interfaced with the microprocessor accesses a telephone line connected to the vending machine and calls the central computer complex. Once communication is established, the microprocessor identifies itself, and transmits current status information. The central computer acknowledges receipt, and transmits the time for the next scheduled call-in back to the microprocessor of the vending machine, along with other control information if desired. Typically, the duration of communications is less than ten seconds.

In addition to prescheduled call ins, the microprocessor and associated interface control circuitry in the vending machine (or point module as referred to hereinafter) can place a real-time call to indicate the occurrence of an alarm condition, or to indicate that it has been serviced by a route man or maintenance person. For example, the alarm conditions include but are not limited to the following:

1. an illegal entry into the vending machine determined by the actuation of a door switch without the proper sequence of actuation of manual pushbutton switches connected in circuit therewith;
2. sold out conditions;
3. vending machine jamming;
4. improper changer operations;
5. the sensing of a temperature within the vending machine above or below predetermined levels with time delay circuit means for recognizing that a high-temperature signal may occur following a service call where the vending machine door had been left open for a considerable period of time;
6. jack-potting of either vend products or money or other failure of the changer mechanisms to dispense proper change;
7. loss of electrical power continuously for a period in excess of a predetermined time;
8. return of electrical power after a recognized loss;
9. an exact-change only condition caused by the changer's inability to provide any further change to customers; and
10. Compressor failure as indicated by an excessive operation period.

It should be understood, as will become more fully apparent hereinafter, that although the preferred system of the present invention includes a microprocessor and associated software instructions to effect the desired monitoring and communication functions, the entire system may be hardwired with suitable logic circuitry to perform the system functions without the need or use of any software instructions at all.

It should be further understood that the term "vending machine" throughout the following description refers to, but is not limited to machines for vending bottled or canned beverages, cup vendors, or vendors for any type of prepackaged goods, cigarettes, or the like.

In addition, although the preferred embodiment of the present invention described hereinafter uses a telephone line as the communication link between the vending machines and the central computer complex, other forms or combinations of communication links such as radio or telegraph communications may be utilized without departing from the spirit and scope of the present invention.

The preferred embodiment of the system of the present invention is a distributed processing system. That is, some of the logic functions are under exclusive control of the microprocessors in the remote point modules and some are controlled by the central computer complex alone. Other logic functions are controlled jointly by both the central computer complex and the point module microprocessors. Thus, the distributed processing system of the present invention provides a wide variety of functions.

BRIEF DESCRIPTION OF THE DRAWINGS

The objects and the attendant advantages of the present invention will be readily appreciated as the same becomes better understood by reference to the following detailed description when considered in conjunction with the accompanying drawings, in which like referenced numerals designate like parts throughout the figures thereof, and wherein:

FIGS. 11 and 12 are flow charts of the "PROCESS DATA INPUTS" subroutine of FIG. 9;

DETAILED DESCRIPTION OF THE DRAWINGS

Figure 1:
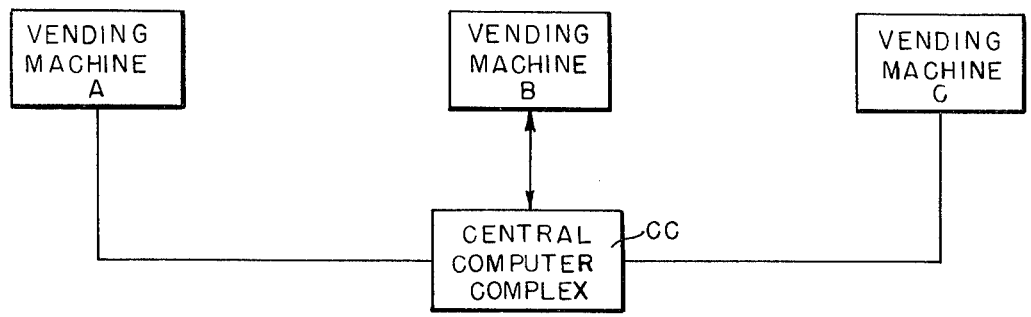
FIG. 1 is a block diagram of the communication system of the present invention.
Figure 10:
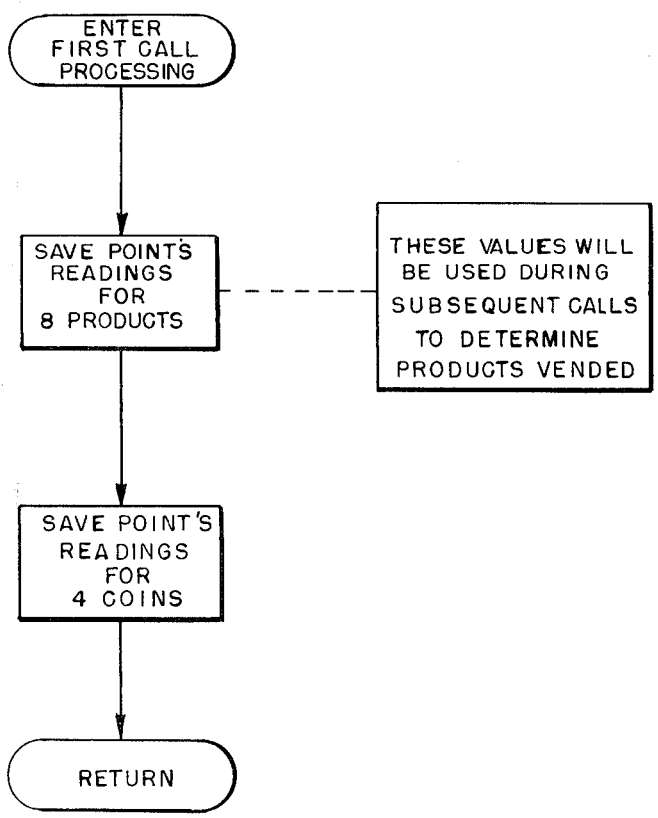
FIG. 10 is a flow chart of the "PROCESS FIRST CALL" subroutine of FIG. 9.

Referring in detail to the drawings, FIG. 1 illustrates a plurality of vending machines A, B, and C, each of which contains a microprocessor and communication link to a central computer complex CC.

Figure 2:
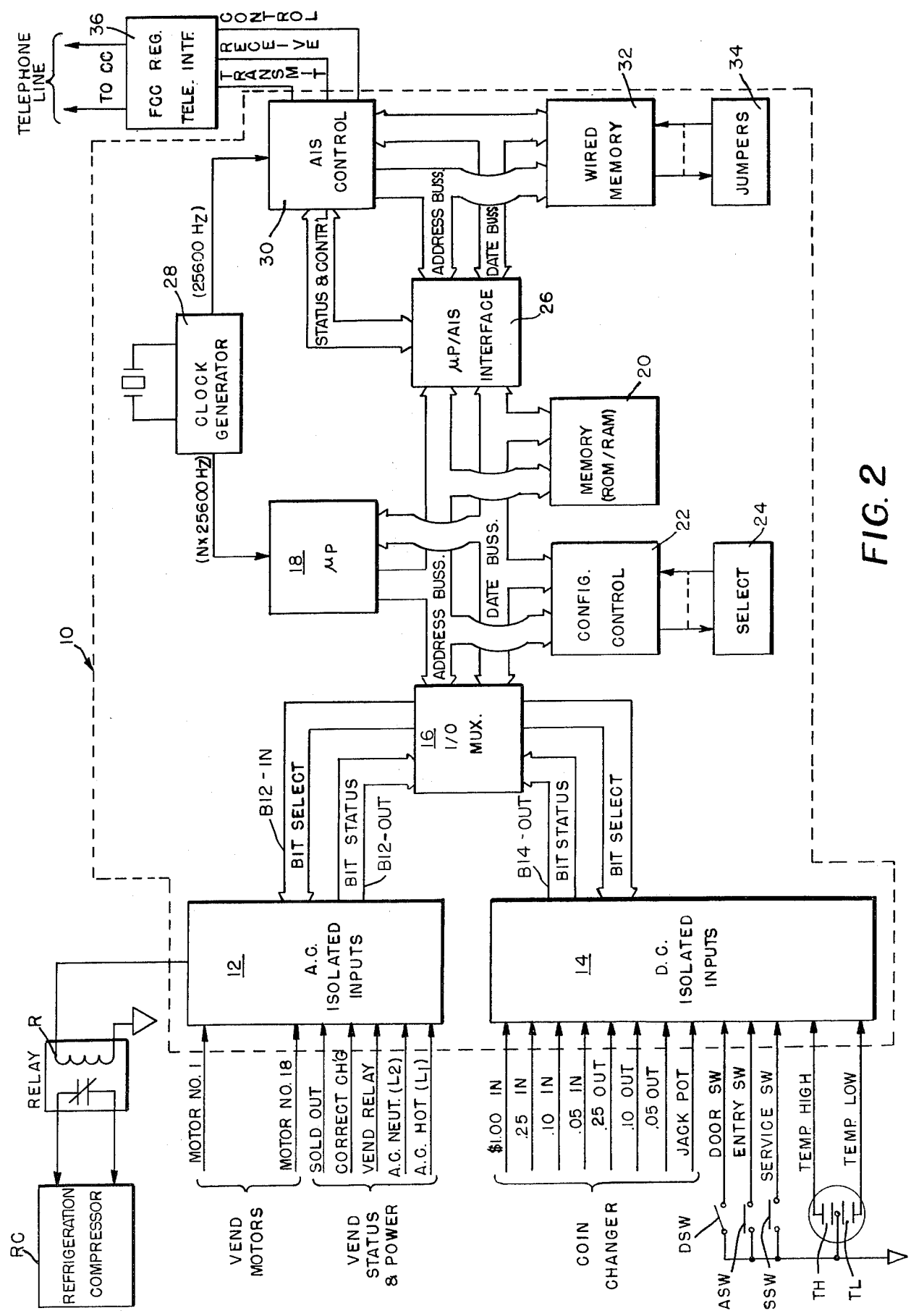
FIG. 2 is a block diagram of a preferred embodiment of a single remote monitoring station contained in each vending machine of FIG. 1.

FIG. 2 illustrates a single point module, generally designated 10, which is disposed in each vending machine to be monitored. The point module 10 includes a microprocessor 18 and associated support circuitry which has the capability of monitoring a vending machine, and reporting that machine's complete status to a central computer CC over a telephone line through FCC regulation telephone interface 36, or alternately through other means of communication, such as radio, well known in the art. The point module of the present invention is designed to easily interface with most models of each manufacturer's automatic vending machines, and selected coin changers. For that reason it is provided with configuration control circuitry 22 which is changeable to achieve this compatibility by operation of select control means 24.

Each point module 10 when first placed in a vending machine at a specified location goes through an initialization process with the central computer CC. The point module identification number and the access telephone number of the central computer are prewired into the point module in a manner to be more fully described hereinafter with reference to wired memory 32.

During initialization a point module 10 is installed into a vending machine A, B, C, etc., and connections are made to various sensing points in the vending machine circuitry as well as to telephone interface 36. Once connected an initialization button (not shown) in the point module 10 is actuated which triggers an initialization call to the central computer CC. Computer CC receives the initialization call, recognizes the point module identification, retrieves from the internal files of computer CC the parameters which apply to that vending machine location (including but not limited to identification of which products are contained in each storage compartment, vend price(s), time for the next scheduled call in, information concerning the control of the compressor functions, etc.) and transmits this internal file information to the point module for loading into its memory. In other words, information with respect to specific vend locations and machines is stored in the memory of the central computer CC as a master record or history of relevant vend data and when any new point module is connected in that vending machine, this information is utilized to initialize that point module for operation.

The act of initialization also includes resetting all counters and registers in the point module to zero and referencing the count values in the central computer counters to zero.

The point module performs validity checking of the received data from central computer CC and subject to passing certain checks, loads data into its RAM memory for use in its subsequent normal functioning. This validity checking is of a conventional variety such as described in U.S. Pat. No. 4,241,237 to Paraskevakos et al.

The signals interfacing with the point module 10 of the present invention may be divided into two classifications of signals, namely, input signals from the vending machine to the point module and output signals from the point module to central computer CC. The input signals are in turn, divided into two respective groups, namely, AC signals and DC signals.

The point module of a preferred embodiment of the present invention has a total capacity of 40 inputs, of which 34 are utilized for vending machine interfacing. It is desirable to isolate both the AC and DC type of input signals from the control logic of the point module 10. This may be done, for example, by using opto type isolators 12 and 14, respectively, as illustrated in FIG. 2. Such isolators present a very small load factor to the vending machine, and yield a minimum of 1,000 volts AC isolation to the logic of the point module. It should be understood that the point module may have many more inputs than 40. For example, it may be expandable to 64 or more inputs.

The vending machine for use with the system of the present invention typically may include 16 or more vend columns, or product storage compartments each of which includes a vend motor, solenoid or other suitable means for dispensing a selected product in response to a command signal. The details of these vend motors and the vending machine per se, are well known in the art, and are not, per se, a portion of this invention. However, the outputs or condition of the respective vend motors are useful in performing many of the logic functions required by the system of the present invention. For example, when a particular vend motor or solenoid is turned on, this is an indication that products are being vended or dispensed from a particular column. This provides address location with respect to products being vended. The vend motor inputs, numbered 1 to 16 in FIG. 1, are taken from the hot side of each vend motor. A potential between any of these signals to machine neutral line "AC neutral ($L_2$)" constitutes a vend from the associated column of a product. A vending machine having only eight columns of product would connect to vend motor inputs 1 through 8, leaving vend inputs 9 through 16 open. This, of course, would provide additional input terminals for the introduction of other desired data into the point module 10. All vend motors inputs are fed through AC opto isolator 12 through bit status line B12-IN to input/output multiplexer 16 of the point module.

Also coupled to the AC opto isolator 12 are the vend status and power inputs "sold-out", "correct change only", and "vend relay". The "sold-out" input is derived by a sensor which detects current flowing through any one of a plurality of "sold-out" indicators associated with the respective storage compartments or columns of the machine. Identification of which product has been sold-out is determined by the central computer, in conjunction with which one of the respective vend motors was in process when the sold-out indicator sensed that such a condition existed in a manner to be more fully explained hereinafter. The "correct-change" input is sensed from the potential between the hot side of a "correct-change" indicator in the vending machine and the machine-neutral ($L_2$). The "vend-relay" input is sensed from a potential between the hot side of the "vend relay" to the machine neutral ($L_2$).

The AC power lines $L_1$ and $L_2$ are a direct and fused connection to the vending machine power supply. $L_2$ is a common return used in sensing all AC type signals while the loss of potential between AC power lines $L_1$ and $L_2$ is used to derive a power loss alarm signal, to be discussed hereinafter.

In the preferred embodiment to FIG. 2 there are also 13 DC inputs from the vending machine to the point module which are introduced through DC opto isolator 14, and bit status line B14-OUT to the point module input/output multiplexer 16. Four of these DC input signals are signals generated in response to the insertion of coins in the coin slot of the vending machine of different denominations. For example, there are provided inputs for $1.00, 25 cents, 10 cents, and 5 cents denominations. There are also three inputs to opto isolator 14 which are generated in response to coins being returned of the respective denominations of 25 cents, 10 cents, and 5 cents. All of these coin-in and coin-out signals are associated with the coin changer mechanism which is a standard mechanism, well known to one of ordinary skill in the vending machine art. The jack-pot input illustrated in FIG. 2 will be discussed further hereinafter.

There is also provided a door switch input from a door switch DSW, an entry switch input from an entry acknowledge switch ASW, and a service switch input from a service switch SSW. Additional DC inputs are provided by high and low temperature sensors TH and TL.

The door switch DSW is suitably located for actuating when the access door to the vending machine is open. This switch may be any suitable type of commercially available switch, such as a microswitch, optical sensor or magnetically actuated proximity switch which would input the open and closed status of the vending machine door to the point module 10.

The entry acknowledge switch ASW, in a preferred embodiment, is a hidden push-button switch inside of the vending machine, the location of which is known by any authorized person entering the vending machine. As will be discussed further hereinafter, the actuation of this switch ASW within a predetermined time, for example, ten seconds after the actuation of the door switch DSW, indicates to the point module that an authorized entry into the vending machine has been made. On the other hand, the absence of a signal of the actuation of the entry acknowledge switch ASW within that predetermined time period, triggers an alarm indicating that an unauthorized entry into the vending machine has been made.

The service switch SSW is provided to create data indicative of the entry into the machine for the purpose of servicing, namely, refilling the machine, emptying the coin box and so forth, has been made in contrast to a maintenance or repair associated entry. That is, if a regular service call is made, the service man, in addition to and after pushing the acknowledge switch ASW after opening the door, would also push the service switch button SSW to clearly distinguish this type of entry from a maintenance entry. Pressing the SSW button without having first pressed the ASW button will result in generation of an illegal entry alarm. Thus, the point module and the central computer complex would be provided with useful data distinguishing between these two types of normal machine entries.

Point module 10 is described in much greater detail in prior co-pending application, which is now U.S. Pat. No. 4,241,237 issued Dec. 23, 1980. All functional circuitry of the point module and microprocessor is of CMOS technology for low power consumption. The use of a microprocessor is preferred because of the large numer of input lines necessary to generate a sufficient amount of data to provide the central computer complex with enough information to manage an efficient vending machine system. In addition, the use of microprocessor circuitry provides a greater flexibility of interfacing with a great number of different types of vending machines by means of configuration control 22 and select means 24.

The remaining portions of the microprocessor are substantially standard type state of the art technology, such as the clock generator 28, the ROM/RAM memory 20, the microprocessor interface circuitry 26, the output control circuitry 30, the hardwired memory 32, and the selectable jumper circuitry 34. For more details of the operation of the microprocessor and associated communication system, reference is made to said prior co-pending application Ser. No. 6,871, filed Jan. 26, 1979, now U.S. Pat. No. 4,241,237 which is incorporated herein by reference.

As instructed in column 33, lines 19 et. seq. of said prior Paraskevakos, et al. '237 patent, the AIS control and communication system may be utilized to monitor the vending machine sensors by applying the input signals described hereinbefore to "Index A" of that system or to a dedicated auxiliary portion of memory for expanded data word transmission as explained therein (e.g., column 25, lines 49 et. seq.). That is, the inputs described with respect to this application on the left hand side of FIG. 1, namely, the outputs of the vending machine sensors could simply be introduced into the "A index" and status report portion of FIG. 2 of the aforementioned application. Of course, suitable programming logic described hereinafter is required to generate the logic functions of the present invention in combination with the logic circuits of microprocessor 18.

Figure 12:
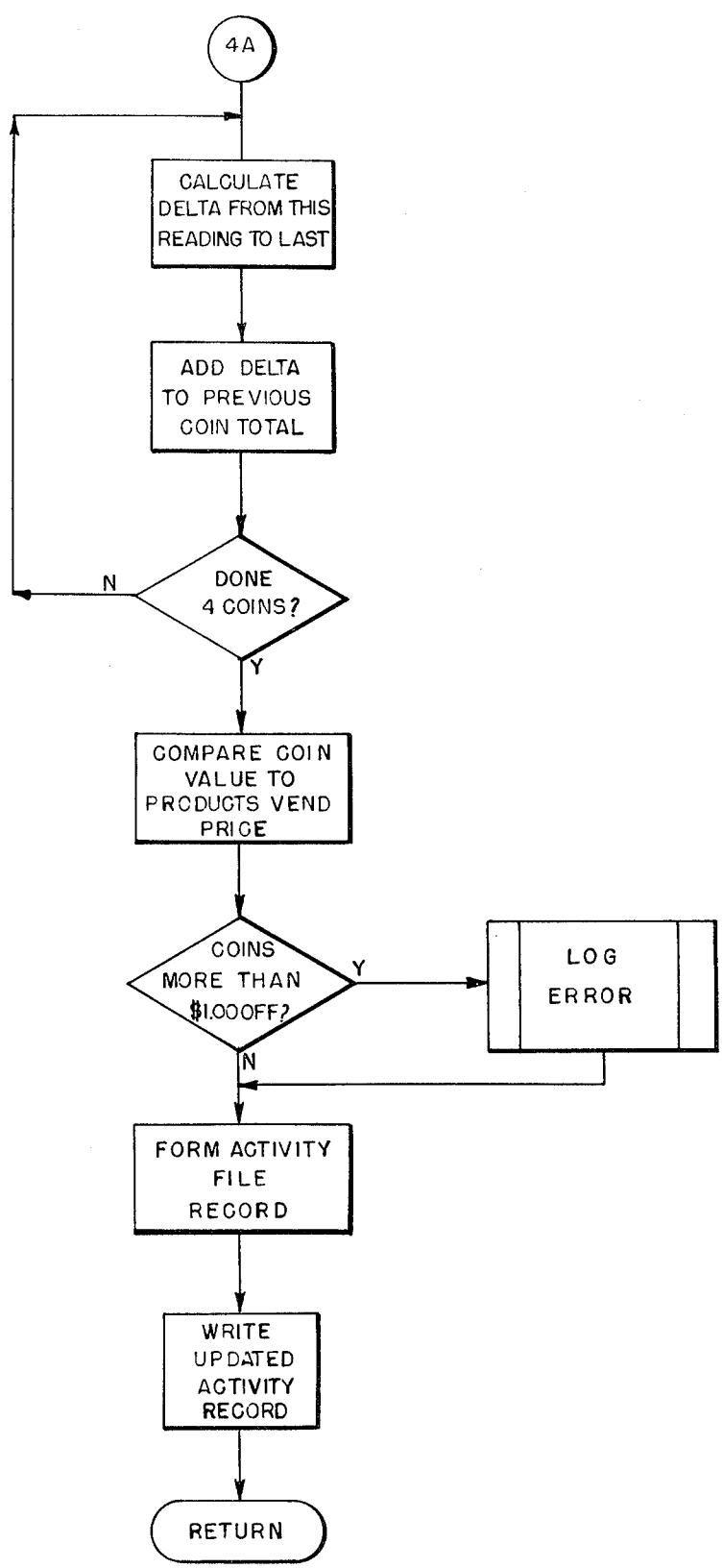
Figure 13:
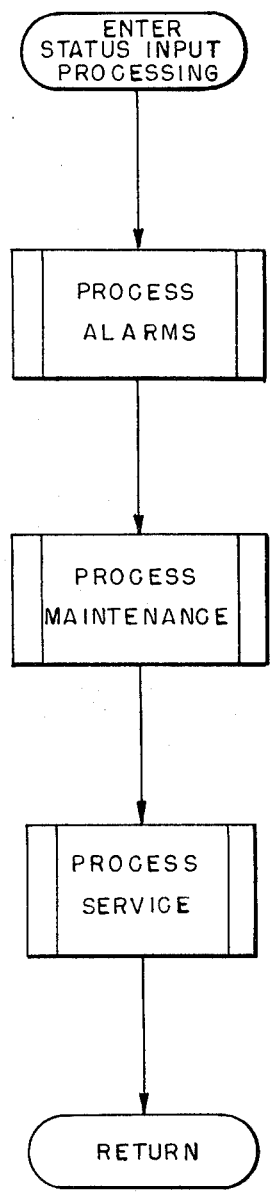
FIG. 13 is a flow chart of the "PROCESS STATUS INPUTS" subroutine of FIG. 9.
Figure 15:
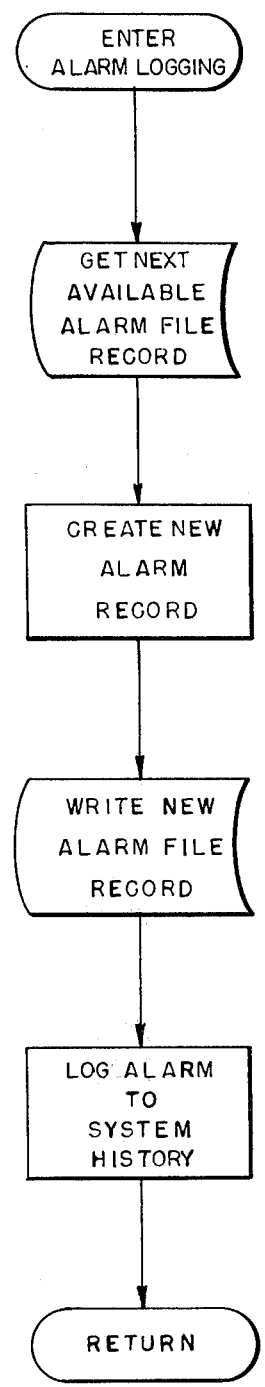
FIG. 15 is a flow chart of a subroutine for an alarm logging function depicted in block AL of FIG. 14.
Figure 14:
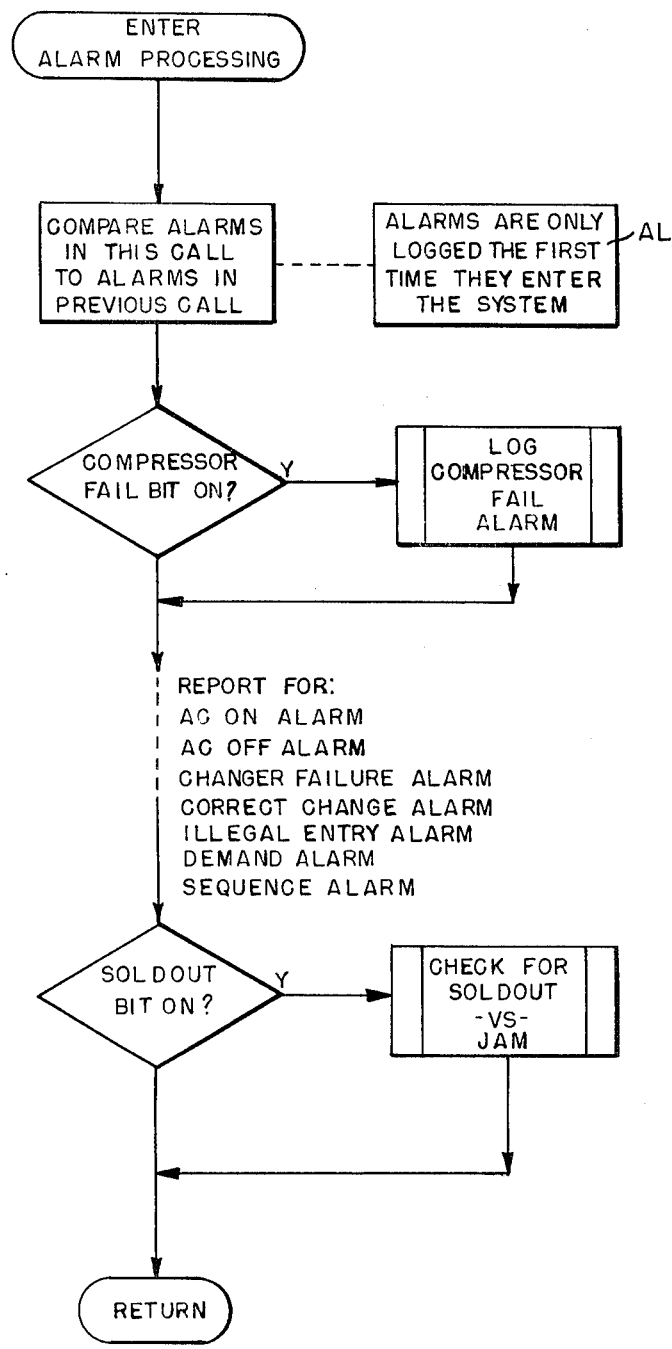
FIG. 14 is a flow chart of the "PROCESS ALARMS" subroutine of FIG. 13.

As further illustrated in FIG. 2, the point module 10 includes a wired memory 32 with jumper means 34, for the storage of the telephone number of the central computer complex and the vending machine account number. The wired memory 32 contains 16 words by four bits, and is programmed by a single wire per word, namely, 16 wires. There are eleven digits which may be used for dialing and may be extended to twelve. However, if long distance dialing is not required, then only the number of digits being dialed need to be programmed (usually 7) into the wired memory 32. For dialing through a PBX system, a pause may be inserted in the dialing sequence to permit connection to an outside line, for example, after dialing "9". A wire is not required for a digit not being dialed. The remaining five words which may be stored in the wire memory 32 are for the account number of the respective vending machine. This enables a combination of $16^5$ total account numbers (1,048,576) which are programmable into the wired memory 32. While the preferred embodiment uses a wired memory for storing this information, semiconductor ROMs or EPROMs or optical memory devices, for example, could also be used for this purpose. The programmed account number is the actual file location key in which the machine's data and status are located within the central computer complex memory. The wire used may be standard 30 GA "wire-wrap" wire. The wire is inserted into insulation displacement strips (2 strips with 16 positions each). By use of the wire memory 32, telephone and account numbers may be programmed and changed without the need for any elaborate equipment such as a PROM programmer. That is, the programming and changing may be facilitated by use of the jumper wires 34. For more details of the hardwired memory 32, reference is made to FIG. 12 of the aforementioned co-pending patent application which is now U.S. Pat. No. 4,241,237 issued Dec. 23, 1980, to Paraskevakos et al, and memory 1208 therein.

All timing within the point module is provided by a clock generator circuit 28 which is crystal controlled. The crystal may be the quartz type having a fundamental frequency of 25600 Hz, this being the frequency required by the point module control logic 30. The microprocessor 18 clock will be derived from the 25600 Hz clock by a phase locked loop. The clock generator 28 is subject to slight inaccuracies over a period of time. For example, the clock may vary on the average of 6 minutes per month. However, as stated in the disclosure of the earlier co-pending application referred to hereinabove, the real time clock within the point module of the present invention is corrected at each communication with the central computer complex. Thus, an accurate time clock is clearly provided in the monitoring system of the present invention.

The output of point module 10 of the present invention is interfaced to a standard telephone line by a FCC registered telephone interface component 36.

The point module of the present invention has the capability of storing and reporting the complete status of products inventory and coinage in the machine at any given time. In the system illustrated in FIG. 1 which has 16 vend columns and associated motors, each coin-in 4 and coin-out 3 has an associated register or counter in the point module memory. Each of these counters in the memory of the point module is incremented upon receipt of each legitimate signal sensed on its related input port. The vent motor counters are 8 bits, or 256 counts and each coin counter is 16 bits or 65,536 counts. This configuration yields a total capacity of 4,096 containers of product, $91,750.40 of coinage into the machine, and $26,214.40 of coinage out of the machine (coin return) per service call. Of course, these figures will vary depending on the price of the products, the number of columns of storage in the vending machine, and so forth.

As stated hereinbefore, the monitoring system of the present invention provides for a plurality of different alarm functions, some of which are related to the occurrence of a single event and the others of which are related to a combination or sequence of events. The following alarms will be reported immediately upon their occurrence to the central computer complex, namely, a "sold-out" status, a "correct change only" status, a power loss if continuous for ten minutes, a jack-pot signal, a door switch open (after 5 seconds), and a high or low temperature (a high temperature will not be reported for two hours after a service routine).

In addition, a jam alarm signal may be generated if a sold-out condition is sensed over 10 seconds after a vend motor has started, and the inventory records in the central computer identify the jam as a sold-out condition.

Figure 4:
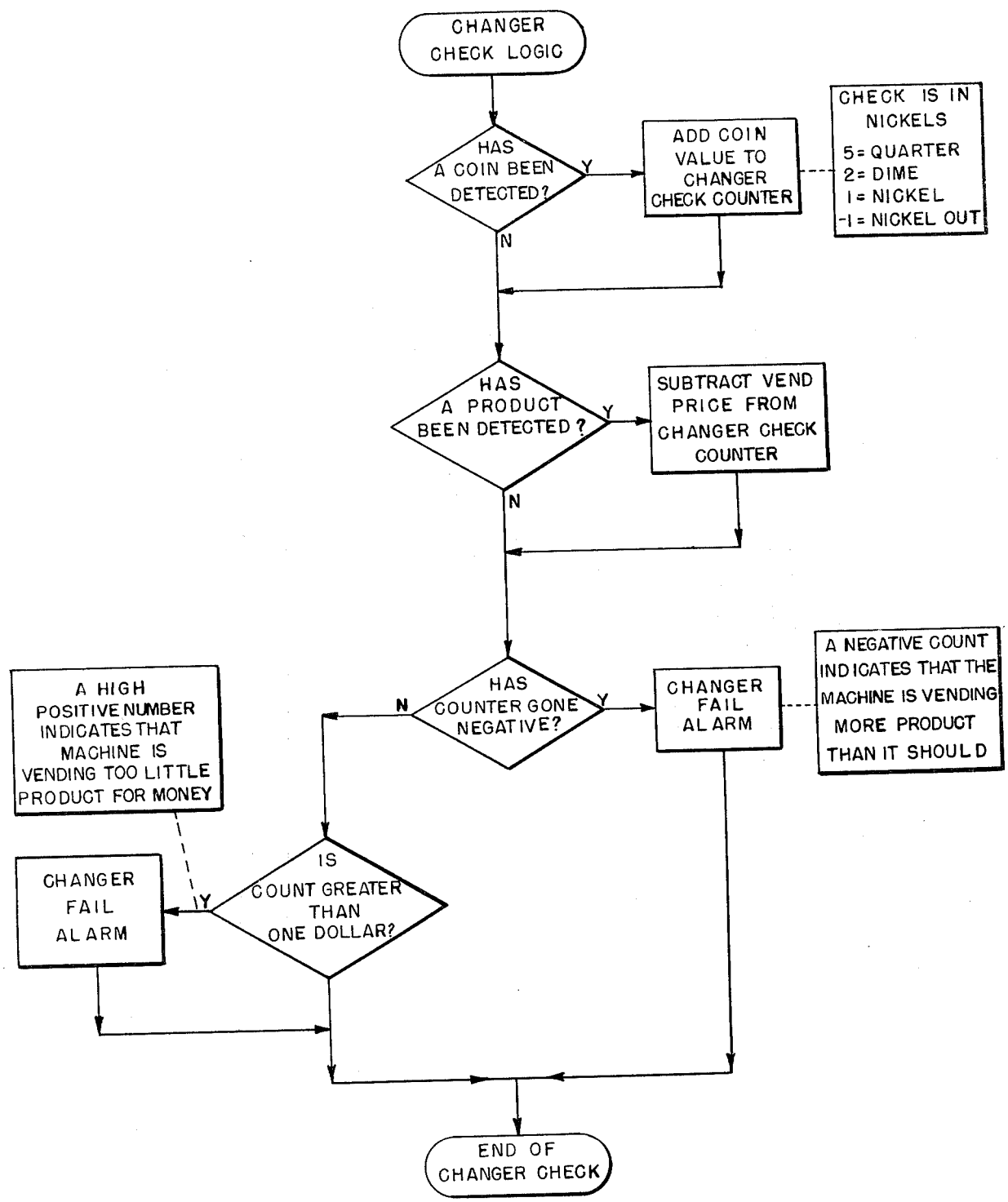
FIG. 4 is a flow chart of the alarm logic functions related to the operation of the coin changers of each vending machine as performed by the logic circuits of the respective point module.

It is also desirable to know if the automatic changer is operating properly in the manner illustrated in the flow chart of FIG. 4. Therefore, the point module calculates from the coins-in and coins-out counters in the point module memory, the difference between the two counters. If the difference does not equal the cost of the product or is negative, an alarm signal is generated. This alarm or condition is commonly referred to as jackpotting; when a product is vended at less than the established vend price or excess change is returned.

The vend price information has been previously communicated to the microprocessor from the central computer complex at the time of the last communication between the two units.

It is desirable to limit improper change alarm calls to the central computer complex to a reasonable minimum value. Thus, the microprocessor logic is instructed to delay overcharge alarm calls until a one dollar minimum of accumulated overcharges occurs. For example, the vending machine is permitted to make twenty five cent overcharges, or any number the cumulative value of which is one dollar, before an alarm call is transmitted to the central computer. This method of handling allows for situations where, due to timing considerations or changer design, it is possible to vend a product prior to dispensing change or to have some credit remaining after the vend.

Undercharge alarm calls, however, are immediately transmitted to the central computer complex as each undercharge condition occurs.

Figure 6:
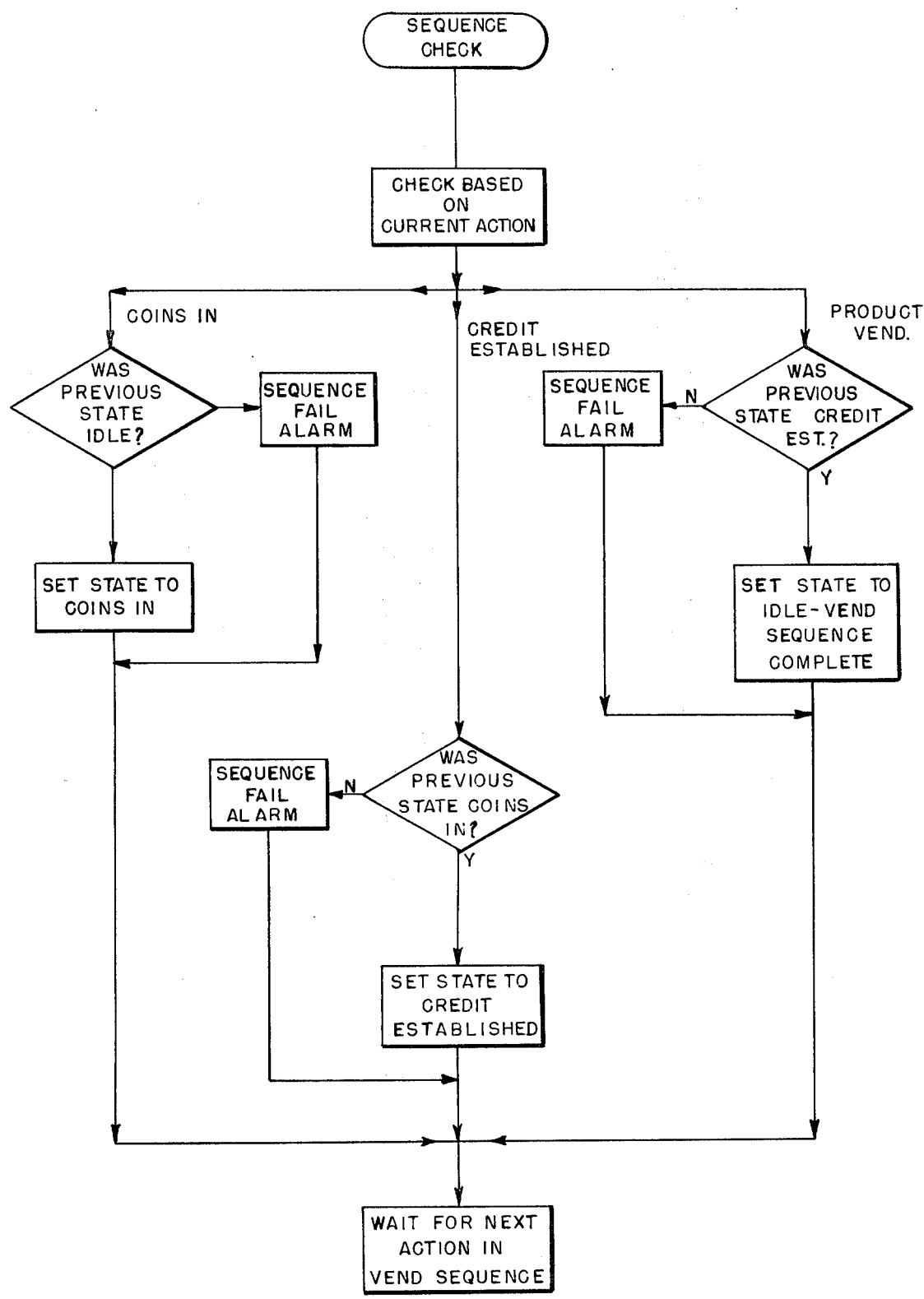
FIG. 6 is a flow chart of how the logic circuits of a point module monitor the sequence integrity of a vending machine and generate an alarm signal if an improper sequence occurs.

It is also desirable to monitor the sequence of operation of the vending machine to determine if it is functioning properly, for example, all of the machine functions from the beginning when the coins are first inserted, to the finish when the product is dispensed have a predetermined sequence. When this predetermined sequence of events is not as intended, a machine failure alarm may be generated. See for example, the flow chart of FIG. 6.

Another indication of a machine failure is when one of the respective vend motors runs too long, or out of sequence with other occurrences, or too often. All of these conditions may be monitored by the point module, and any of these conditions which are not normal are interpreted as a machine malfunction for which a machine failure alarm is generated and transmitted to the central computer.

Figure 3:
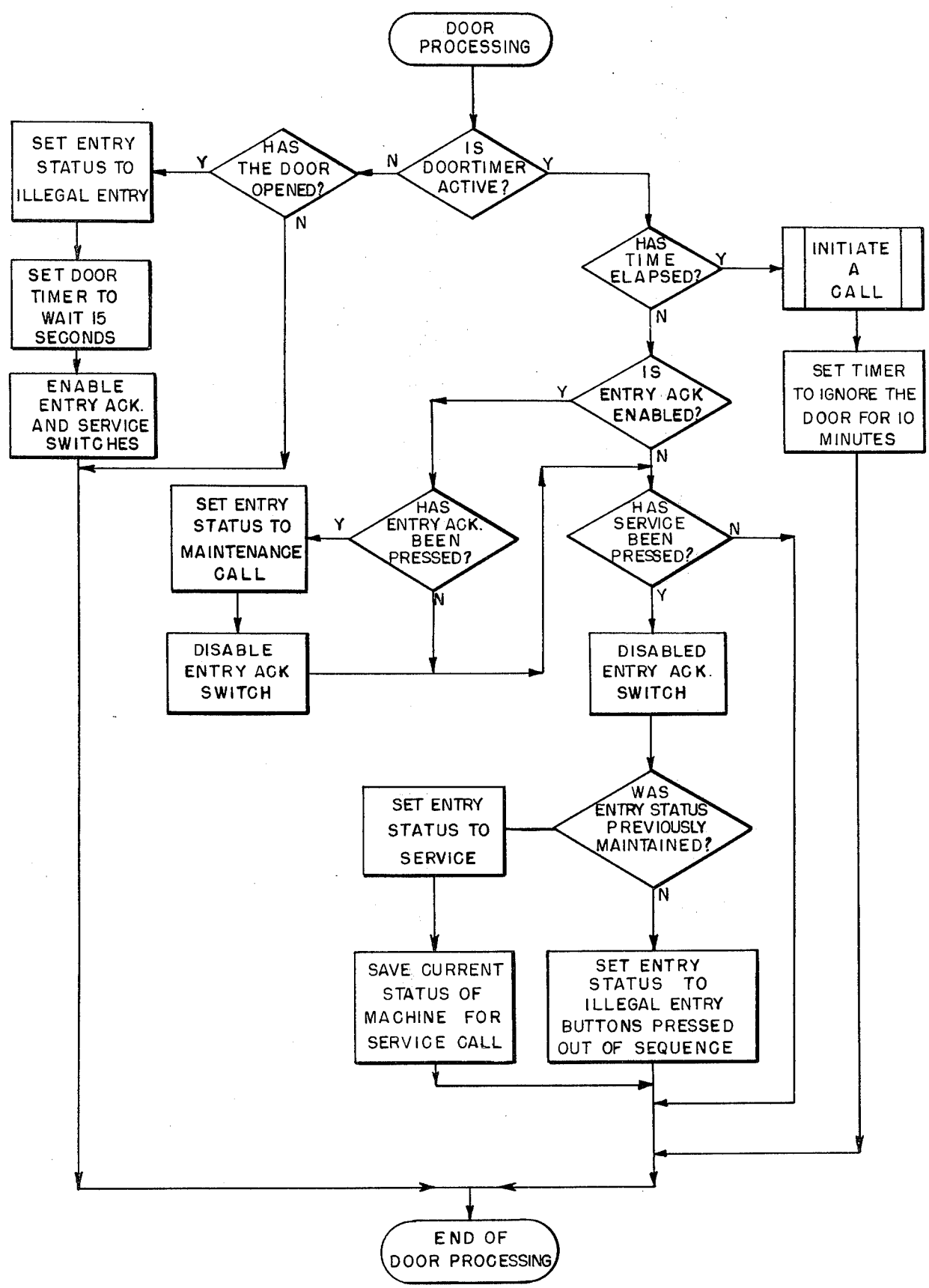
FIG. 3 is a flow chart of the alarm logic functions performed by the point module of the present invention following the opening of a vending machine door including the generation of illegal entry, service call, and maintenance call signals.

An illegal entry alarm is generated in accordance with the flow chart of FIG. 3 when the door switch DSW is actuated, and no signal is received from actuation of the entry acknowledge swith ASW within 10 seconds after actuation of the door switch DSW. On the other hand, if both the entry acknowledge switch and the service switch SSW are actuated within 10 seconds after actuation of the door switch DSW, this indicated the occurrence of a service call which is communicated to the central computer complex. Also, as stated hereinbefore, the SSW and ASW buttons must be pushed in the proper sequence, i.e., the actuation of the ASW button must precede actuation of the SSW button or an illegal entry alarm is generated. If only the entry acknowledge switch is pushed during the 10 second period following the opening of the door, this is the indication of a maintenance as opposed to a service call. Thus, these three switches DSW, ASW, and SSW in combination provide very valuable information with respect to each vending machine, for analysis at the central computer complex. That is, these three switches in combination create digital data from which the central computer complex may determine if an illegal entry has been made, a service call has been made, or a maintenance call has been made on the respective vending machines. Entry calls from respective vending machines are then correlated with scheduled service calls or maintenance calls by the central computer complex to verify that such calls are authorized and will generate unscheduled service call alarms, if service calls are not scheduled.

As further illustrated in the flow chart of FIG. 3 following the passage of the above-mentioned 10 second time period, the timer is again enabled for a control period of 10 minutes. During this 10 minute period the door may be closed and re-opened without starting a new illegal entry routine, i.e., the door switch signal is ignored. Thus, when a service man enters the machine for the first time he must push all appropriate buttons within 10 seconds. However, he may then close the machine and return to his truck. If he re-enters the machine within 10 minutes an illegal entry alarm will not be generated if he fails to push the timer button.

A power return signal is also generated in the logic of the point module following a loss of power that is continuous for more than 10 minutes. This return of power is sensed by the presence of power between the AC lines $L_1$ and $L_2$ coupled to the input of opto AC isolator 12.

Figure 7:
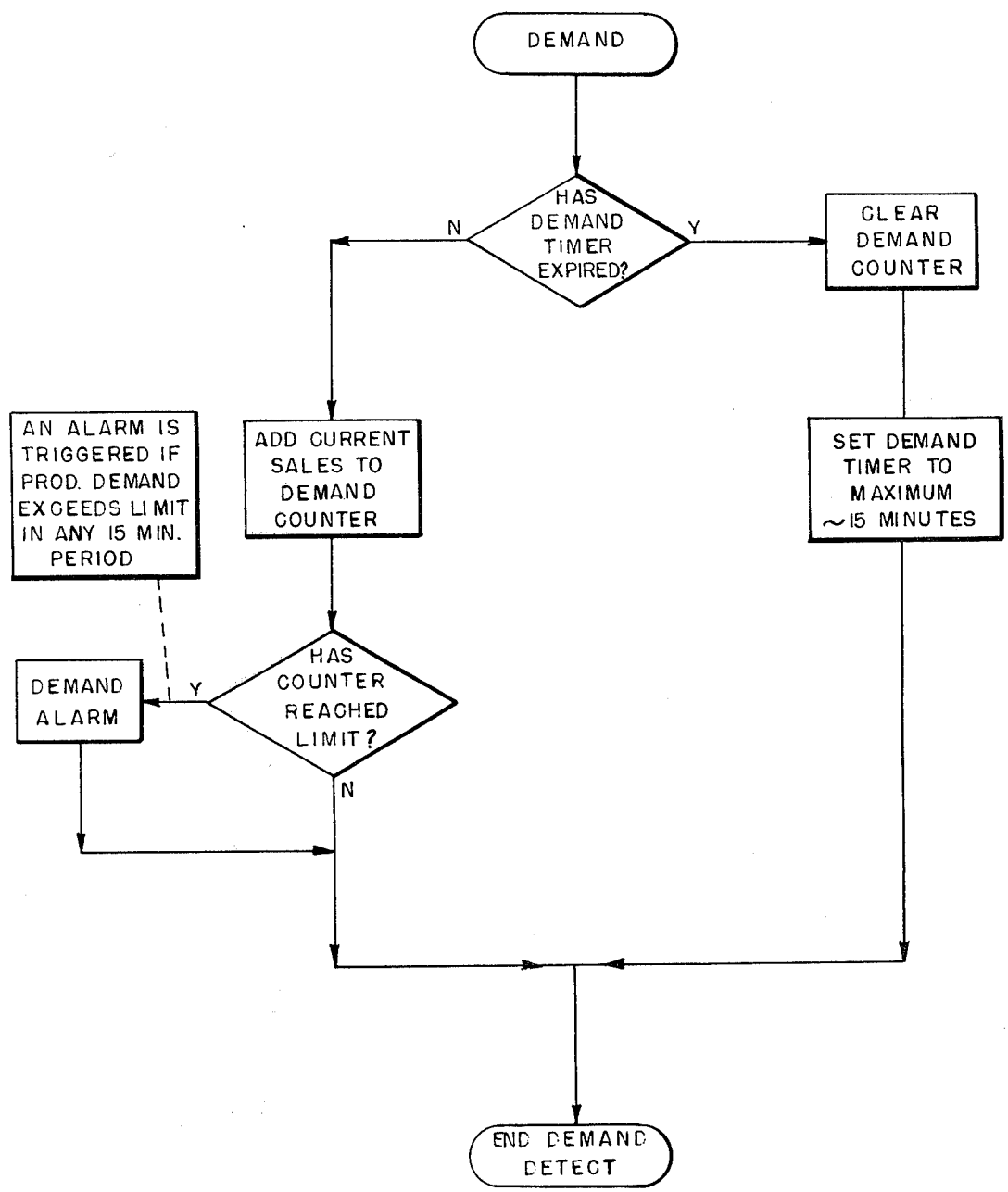
FIG. 7 is a flow chart of how a point module determines if product demand exceeds a predetermined limit and generates an alarm signal when that limit is exceeded.
Figure 8:
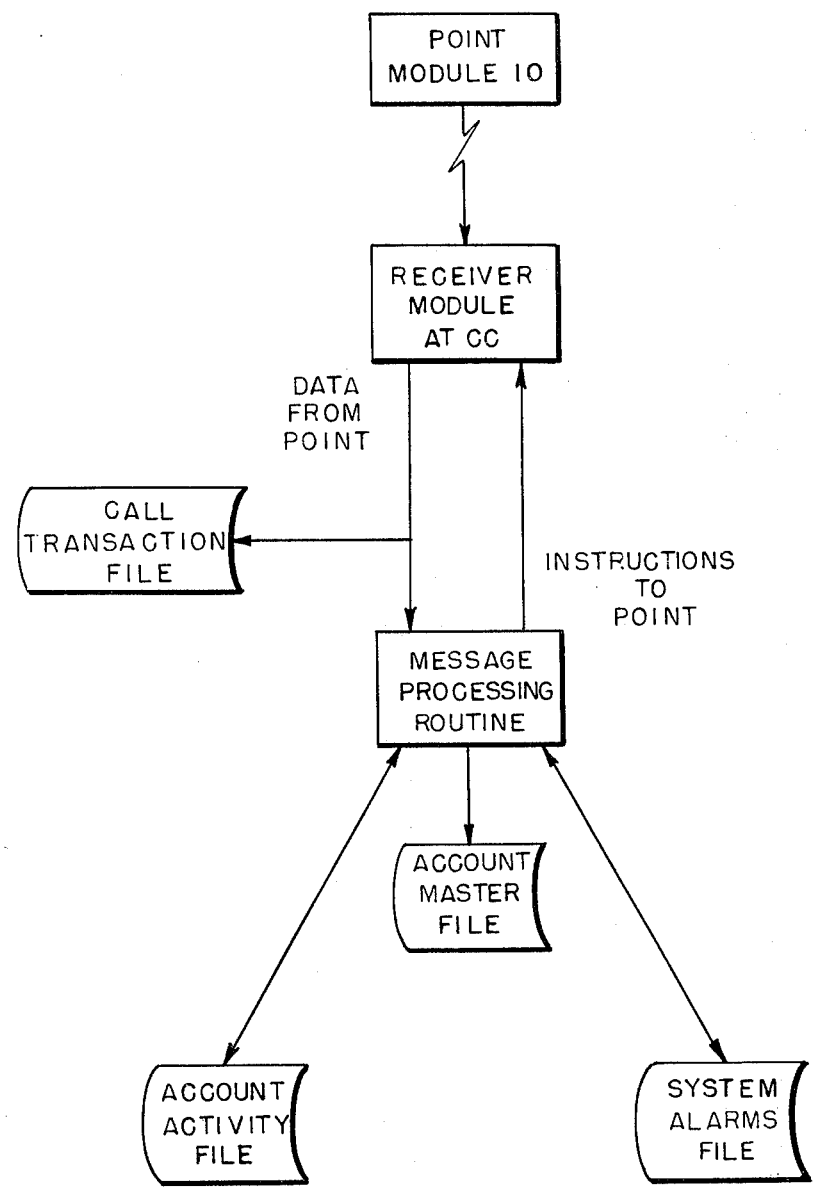
FIG. 8 is a flow chart of the general manner in which messages from each point module are received and processed by the logic circuits within the central computer complex for a vending machine with eight product columns as an example.
Figure 9:
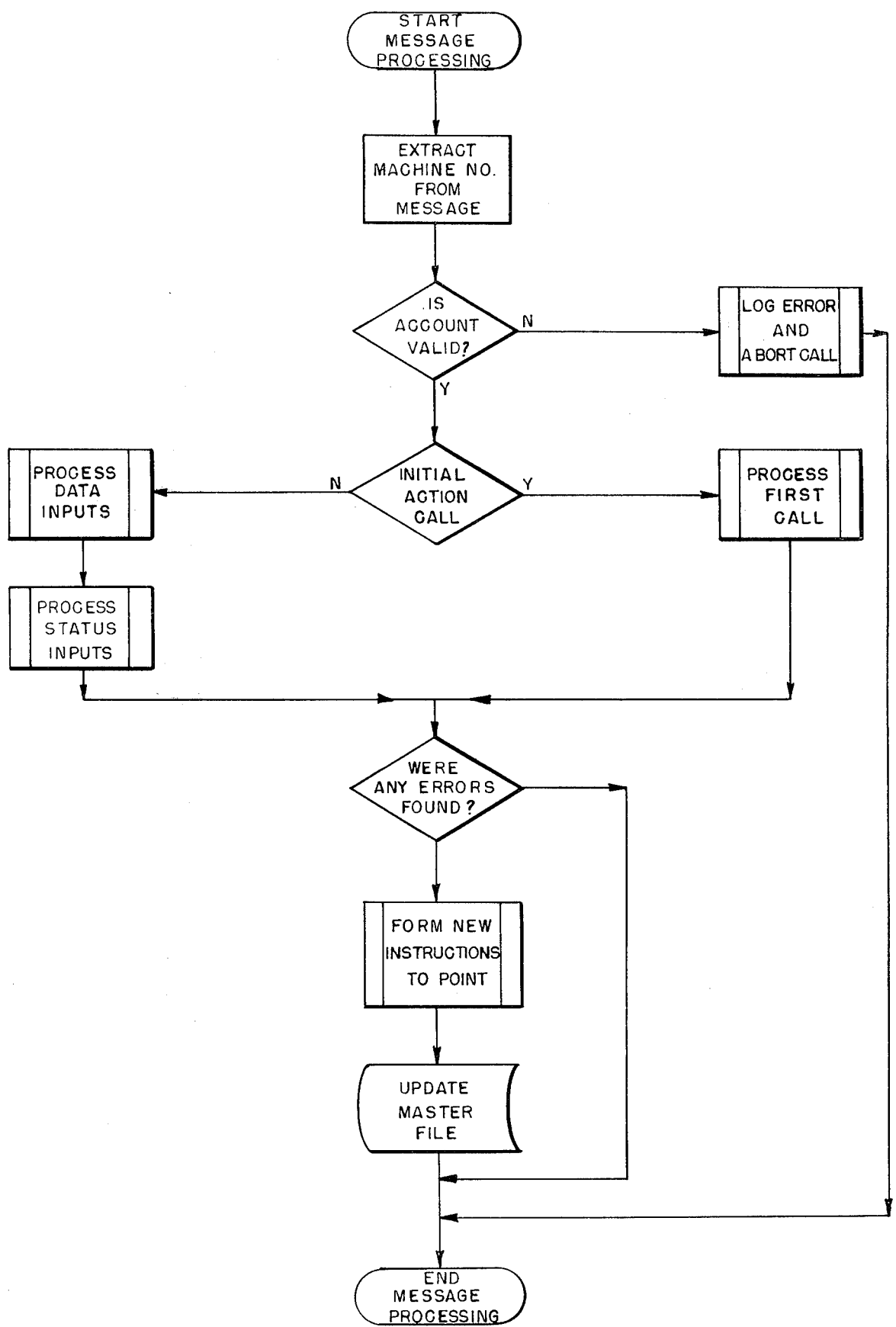
FIG. 9 is a flow chart of the "MESSAGE PROCESSING ROUTINE" of FIG. 8.

A demand alarm may be generated in accordance with the logic functions of FIG. 7 if any product has greater than (n) number of of sales over a period of (t) seconds. That is, the point module 10 has logic which senses the rate of vend of each particular product, and when this rate of vend exceeds a predetermined limit, a demand alarm signal is generated.

It should be understood that the system of the present invention is capable of having many other alarm functions and that the above examples are merely those of the preferred embodiments of the present invention.

Figure 5:
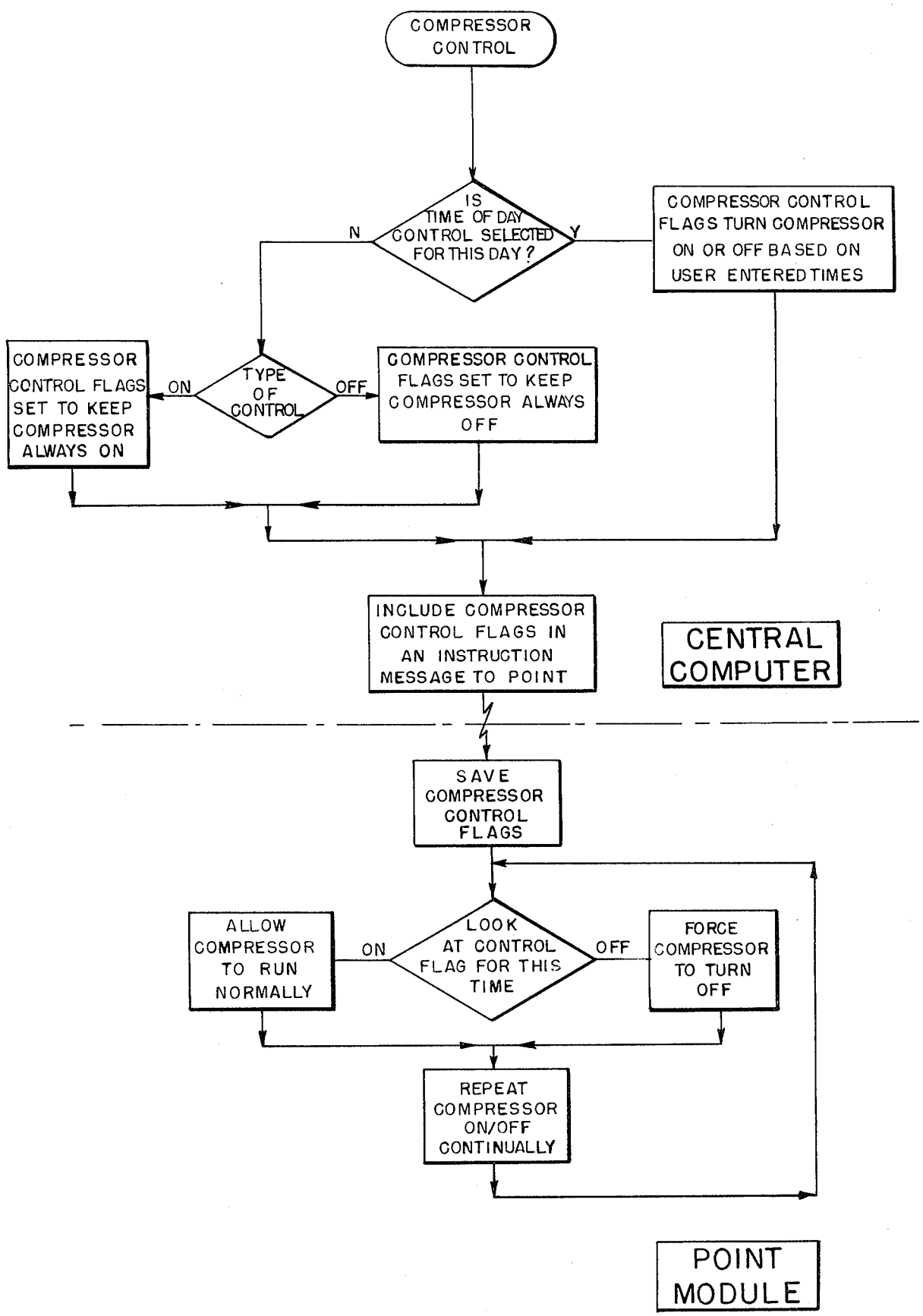
FIG. 5 is a flow chart of the logic functions performed by the distributed logic of the point modules and the central computer complex with respect to the operation of the refrigeration systems of the vending machines.

The distributed logic system of the present invention, namely, the capability of the central computer commplex to perform or share some logic functions with each microprocessor, provides a variety of useful functions to the system of the present invention. For example, the operating cycle of refrigeration compressor RC may be controlled by the combined logic of the central computer CC and the associated microprocessor in the following manner, as illustrated in the flow chart of FIG. 5.

As stated hereinbefore, the preferred communication system of the present invention reports some data on a prescheduled call-in basis, and some data, such an alarm conditions, immediately to the central computer. When the data is reported on a prescheduled basis the central computer answers each point module and instructs that module as to the next desired call-in time. These instructions may also include instructions as to desired refrigeration operating cycles which will minimize the consumption of energy. These instructions provide control data to the microprocessor in the point module to allow override turn off of the compressor power via relay RC during periods when the vending machine has historically not been used. The central computer CC of course has stored therein the history of usage of that vending machine location and thus has the capability of issuing appropriate instructions.

In a preferred embodiment of the compressor control instructions are provided on a calendar day or week basis, after each prescheduled call-in. The compressor may be instructed to be under thermostatic control for entire days, powered off for entire days or have days when it is turned off or on at specific times of day. If a time of day mode is implemented the instructions may be divided into twelve 2-hour periods. Each of these 2-hour periods may be either under thermostatic control or power off by the microprocessor as desired. As conditions change, such as seasonal temperature and humidity changes, the control cycle of the respective vending machine compressors may be changed from the central computer complex at the time of the next scheduled call-in. This schedule may be entered and modified as desired by an appropriately authorized operator at a terminal attached to the central computer CC. Any changes so entered are relayed to the microprocessor at the time of its next call-in whether scheduled or non-scheduled.

The central computer CC, or the microprocessor, may include means for sensing if the compressor runs continuously for an extended period of time which would indicate a malfunction. For example, if the compressor runs continuously for 4 hours or more this signals a probable malfunction in the refrigeration system.

The logic of the central computer CC may perform many other useful control functions. For example, by storing scheduled times for service and maintenance calls in the respective vending machines, it can distinguish between scheduled and unscheduled service or maintenance calls. A service call, as stated hereinbefore, is identified when a proper sequence of entry acknowledge and service call signals are received. By comparing the occurrence of service calls with scheduled service call times, scheduled and unscheduled service calls are distinguishable. Likewise, a maintenance call or alarm which is identified by the absence of a service call alarm following a legal entry, can be classified as a scheduled or unscheduled maintenance call in a similar fashion. This ability to distinguish between scheduled and unscheduled entries into the vending machines provides an added degree of security to the machines. Obviously unscheduled entries could constitute illegal entries which have successfully circumvented the illegal entry alarm logic. If an unusual number of unscheduled entries occur of if they occur in the middle of the night, in all probability an illegal entry may have occurred.

Figure 16:
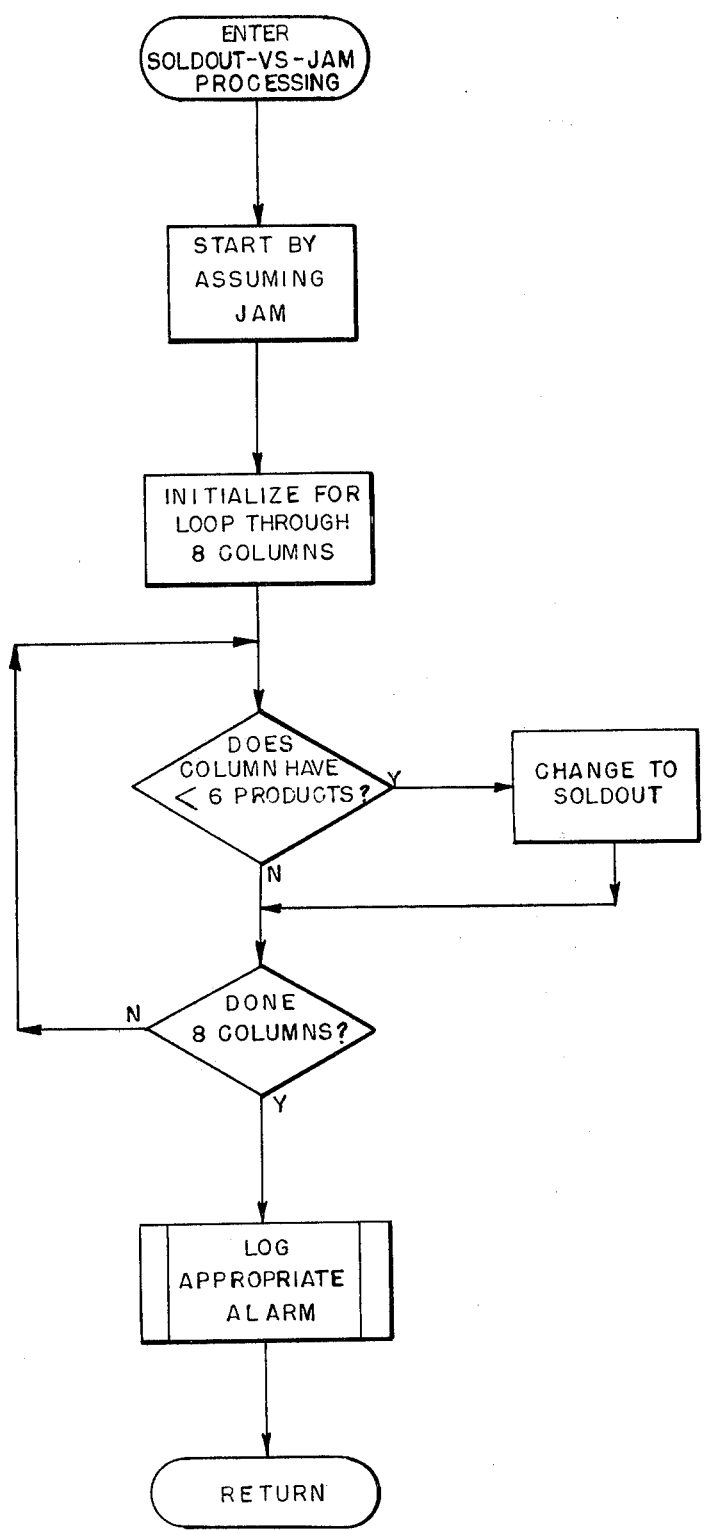
FIG. 16 is a flow chart of how the logic circuits of the central computer complex distinguish between sold-out and jam conditions in conjunction with the coin changer routine of FIG. 4, this flow chart being exemplary for an eight product column vending machine.

The central computer logic may also be utilized to distinguish between a jam and a "sold-out" condition in a vending machine in the manner illustrated in the flow chart of FIG. 16. The sold-out indicators in conventional vending machines are usually energized when all products of a particular column or compartment are either gone or if those products become jammed. Since the central computer stores data related to product inventory per column or compartment of the vending machies, this inventory data can be compared with the occurrence of a sold-out indicator signal to distinguish between a sold-out condition and a jammed condition. That is, if the inventory records indicat that a column or compartment should be empty (empty for example being six products or less), that information coupled with the occurrence of a sold-out signal indicates a sold-out condition. On the other hand, a sold-out signal coupled with inventory information that a compartment or column is not empty indicates a jam condition.

The central computer logic may also be arranged to preclude classifying a sold-out condition of a selected product until a plurality of columns of product are empty. For example, a primary product to be vended may occupy more than one column. Thus, it would be inaccurate to indicate a sold-out condition until all of those columns are empty.

It should be understood that communication systems other than that described in co-pending application Ser. No. 6,871, filed Jan. 26, 1979, can be used to achieve the objects of the present invention. For example, state of the art interrogate and answer back systems may be utilized. One example of a suitable remote monitoring and communication system is described in U.S. Pat. No. 3,357,011 to Diaz. The hardware contained in both the microprocessor 18 of the system of the present invention and in the central computer CC performs the various claimed logic functions under control of programs which can be derived from the flow charts of FIGS. 3 to 16.

Each of the flow charts are self-explanatory and have been discussed hereinbefore in conjunction with the operation of the respective logic functions. The flow charts of FIGS. 3 to 7 describe logic functions which are performed for the most part within the point module 10. The flow charts of FIGS. 8 to 16 describe logic functions which are performed within the central computer complex upon data received from the respective point modules 10.

The system for the remote monitoring of vending machines being thus described, it should be understood that modifications to that system may be made as would occur to one of ordinary skill in the art without departing from the spirit and scope of the present invention.

We claim:

1. A system for the remote monitoring of sensors in a vending machine and for automatically communicating the condition of said sensors to a central computer complex comprising:
   a plurality of storage compartments for containing products to be vended;
   door means in said vending machine providing access to said storage compartments;
   door switch means for sensing when said door is open and generating a door open signal;
   entry acknowledge switch means within said vending machine which is inaccessible until said door means is opened, said entry acknowledge switch means generating a legal entry signal when actuated within a predetermined period of time after the generation of said door open signal;
   timer means for measuring said predetermined period of time after the generation of said door open signal;
   logic circuit means for sensing if said entry acknowledge switch means is actuated during said predetermined period of time;
   alarm generating means coupled to said logic circuit means for transmitting an illegal entry alarm signal to said central computer complex if said entry acknowledge switch is not actuated within said predetermined period of time;
   service switch means for generating a service signal in response to the manual actuation thereof indicative of an entry into said vending machine to service the same; and
   means for generating and transmitting a service alarm signal to said central computer complex in response to the occurrence of said service signal in combination with said legal entry signal.

2. The system of claim 1 further comprising:
   sequence sensing means coupled to said entry acknowledge switch means and said service switch means for determining the sequence of actuation of said entry acknowledge and service switch means; and
   means for generating and transmitting an illegal entry alarm signal to said central computer complex when the actuation of said service switch means precedes the actuation of said entry acknowledge switch means.

3. The system of claims 1 or 2 wherein said central computer complex includes:
   means for comparing the time of occurrence of said service alarm signal with the time of a predetermined scheduled service call stored in the memory thereof, in order to distinguish between scheduled and unscheduled service calls.

4. The system of claims 1 or 2 wherein said central computer complex includes:
   logic means for classifying the actuation of said entry acknowledge switch means within said predetermined time and the absence of a subsequent service alarm signal as a maintenance alarm; and
   means for comparing the time of occurrence of the maintenance alarm condition with the time of scheduled maintenance calls stored in the memory thereof in order to distinguish between scheduled and unscheduled maintenance calls.

5. The system of claims 1 or 2 further comprising:
   means for measuring the temperature within said vending machine;
   means for generating and transmitting a temperature alarm signal to said central computer complex when said temperature is either above or below a predetermined level; and
   means for precluding the transmission of an alarm signal indicative of a temperature above said predetermined level for a predetermined period of time following the generation of said service alarm signal.

6. The system of claims 1 or 2 further comprising:
   logic circuit means responsive to the expiration of said predetermined time for setting said timer means for a control period of a predetermined duration; and
   means for precluding the generation of said door open signal during said control period.

7. A system for the remote monitoring of sensors in a coin-operated vending machine and for automatically communicating the condition of said sensors to a central computer complex comprising:
   a plurality of storage compartments for containing products to be vended;
   means for sensing each vend of a product from each of said compartments;
   changer means for dispensing the correct change to a customer in response to the request for a selected vend accompanied by the insertion into a coin slot of an amount of coinage in excess of that required for the selected vend, said changer means generating a changer return signal during the period that change is being dispensed;
   means for sensing the presence or absence of a vend during and following the dispensing period of said change; and
   means for generating and transmitting an alarm signal to said central computer complex in the absence of a sensed vend during and following said change dispensing period.

8. The system of claim 7 further comprising:
   means for counting the number of vends which occur during said change dispensing period; and
   means for generating and transmitting an alarm signal to said central computer complex when said number of vends exceeds a number determined by the accumulated value of credit established.

9. The system of claim 7 further comprising:
   means for counting the number of denominations of coins dispensed from said changer means;
   means for determining if said number and denominations total a correct amount of change; and
   means for generating and transmitting an alarm signal to said central computer complex when an incorrect amount of change is dispensed.

10. The system of claim 9 further comprising:
    means for determining the monetary amount of underchange dispensed for each change dispensing transaction;
    register means for storing accumulated totals of underchange occurring over a period of time; and
    means for generating an alarm signal only after said accumulated total exceeds a predetermined amount.

11. A system for the remote monitoring of sensors in a vending machine and for automatically communicating the condition of said sensors to a central computer complex comprising:
    a plurality of storage compartments for containing products to be vended;

means for sensing each vend of a product from each of said compartments;

register means for counting the total number of vends from each of said compartments;

vend actuator means associated with each of said storage compartments for causing a vend from said compartments when said associated vend actuator means is on;

sold-out sensor means associated with each of said storage compartments for generating a sold-out signal when the last product in said compartment has been dispensed;

logic means for determining which of said vend actuator means was on when a sold-out signal was generated to correlate said sold-out signal to a specific storage compartment; and said central computer complex including;
means for scanning inventory records for said respective columns stored in the memory thereof at the time of occurrence of a sold-out signal for said column; and means for classifying said sold-out signal as a sold-out condition when said inventory records indicate a near empty condition for the column and as a jam condition when said inventory records do not indicate a near empty condition for that column.

* * * * *